United States Patent [19]

Uchida et al.

[11] 3,838,248

[45] Sept. 24, 1974

[54] TEMPERATURE CONTROL DEVICE FOR THERMOSTATIC OVEN

[75] Inventors: Hisashi Uchida; Takeshige Hamatsuki, both of Tokyo, Japan

[73] Assignee: Nippon Electric Company, Limited, Tokyo-to, Japan

[22] Filed: Sept. 6, 1973

[21] Appl. No.: 394,873

[30] Foreign Application Priority Data

Sept. 7, 1972  Japan.............................. 47-90212

[52] U.S. Cl................ 219/210, 219/499, 219/501, 219/505, 219/510, 307/310, 310/8.9
[51] Int. Cl. ........................................... H05b 1/00
[58] Field of Search .......... 219/209, 210, 406, 412, 219/407, 413, 482, 492, 494, 499, 501, 504, 505, 510; 307/229, 310; 310/8.9

[56] References Cited
UNITED STATES PATENTS

| | | |
|---|---|---|
| 2,846,596 | 8/1958 | Corbin................................ 310/8.9 |
| 2,973,420 | 2/1961 | Craiglow et al..................... 219/499 |
| 3,007,023 | 10/1961 | Johnson et al...................... 219/210 |
| 3,201,621 | 8/1965 | Milner............................ 219/499 X |
| 3,299,300 | 1/1967 | Read et al....................... 219/501 X |
| 3,715,563 | 2/1973 | Bloch................................. 219/210 |

*Primary Examiner*—C. L. Albritton
*Attorney, Agent, or Firm*—Sughrue, Rothwell, Mion, Zinn & Macpeak

[57] ABSTRACT

A temperature control device for a thermostatic oven or the like is provided with an input temperature-sensitive, resistive bridge network. Any imbalance voltage in the bride network is integrated by an electronic integrator to provide an output intergrated voltage. The output integrated voltage is amplified by a power amplifier which supplies the heater element in the oven. The effect of the arrangement is such as to minimize the offset voltage in the feedback loop with the result that changes in the ambient temperature and power supply voltage have less effect on the operation of the device.

3 Claims, 4 Drawing Figures

PATENTED SEP 24 1974　3,838,248

3,838,248

TEMPERATURE CONTROL DEVICE FOR THERMOSTATIC OVEN

BACKGROUND OF THE INVENTION

1. Field of the Invention

The present invention relates to a temperature control device for a thermostatic oven for maintaining a crystal oscillator and the like at a constant temperature.

2. Description of the Prior Art

In general, temperature control devices for a thermostatic oven may be composed of a network including a temperature-sensitive resistor, a DC amplifier, a power amplifier, and a heater. The deviation between the actual temperature of the thermostatic oven and a reference temperature determined by the resistance network (in the form of a bridge as an example) is detected by the temperature control device. An electric power proportional to the deviation is supplied to the heater. Accordingly, this proportional control system inevitably involves an offset. The temperature in the thermostatic oven varies by disturbances imposed on the control system (for example, variations in the ambient temperature, the supply voltage, the amplification factor, etc.). In order to reduce the offset, one solution has been to increase the amplification factor of the control system. This solution, however, is often attended with difficulties. For example, where a metallic resistance wire is employed for the temperature-sensitive resistor, a complicated amplifier is required in order to provide a sufficient amplification factor for the control system. When the amplification factor is raised excessively, it is sometimes the case that the phase margin of the control system is lost, resulting in instability of the control system. There has also been known a temperature control system with proportional, derivative and integral operations in order to lessen the offset and to increase the stability of the control system. This temperature control device, however, is complicated in circuit arrangement and difficult in adjustment (Refer to "Automatic Process Control" by D. P. Eckman - John Wiley & Sons, Inc. pp. 71–73).

SUMMARY OF THE INVENTION

An object of the present invention is to provide a highly stable temperature control device which employs an integrating amplifier instead of the DC amplifier in order to diminish the offset and which is small in size, inexpensive to manufacture and less vulnerable to disturbances.

In the temperature control device amploying an integrator as provided in accordance with the present invention, in the presence of the deviation between an actual temperature and a reference temperature determined by a network including temperature-sensitive resistors (in the form of a bridge as an example), electric power is supplied to a heater resistor until the deviation disappears.

Consequently, in the ideal case where the amplification factor and input impedance of the operational amplifier of the integrator are very large and where the output impedance is zero, the offset decreases to substantially zero and the influences due to the disturbances of the control system have no effect. In practice, a small-sized and inexpensive integrator approaching such ideal conditions can be comparatively easily obtained by making use of an integrated circuit for linear amplification.

BRIEF DESCRIPTION OF THE DRAWINGS

Detailed explanation will be made hereunder with reference to the accompanying drawings, wherein.

DESCRIPTION OF THE PREFERRED EMBODIMENT

Figure 1:
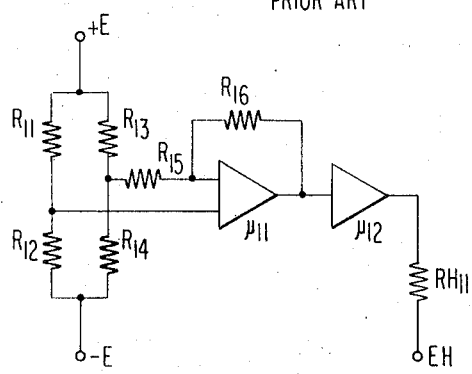
FIG. 1 is a block diagram of an example of known temperature control devices of the proportional type as employs a DC amplifier.

Referring to FIG. 1, a bridge is constructed of fixed resistors $R_{11}$, $R_{13}$ and $R_{14}$ and a temperature-sensitive resistor $R_{12}$ which has a negative temperature coefficient. E is a power supply voltage for the bridge. An output voltage of the bridge, which is proportional to the deviation between an actual temperature and a reference temperature determined by bridge balancing conditions, is supplied through a resistor $R_{15}$ to a DC amplifier $\mu_{11}$. An output voltage of the amplifier $\mu_{11}$ is fed back through a resistor $R_{16}$ to the input thereof. Simultaneously therewith, it is amplified in a power amplifier $\mu_{12}$ to supply the electric power to a heater resistor $R_{H11}$. $E_H$ is a power supply voltage for the heater. The heater power is proportional to the deviation from the reference temperature. The amplification factor of the DC amplifier becomes less than $R_{16}/R_{15}$. Where a temperature-sensitive resistor of low temperature coefficient (for example, a metallic resistance wire) is used, the amplification factor of the whole control system becomes small, even if a higher gain amplifier is used to improve the temperature control performance.

Figure 2:
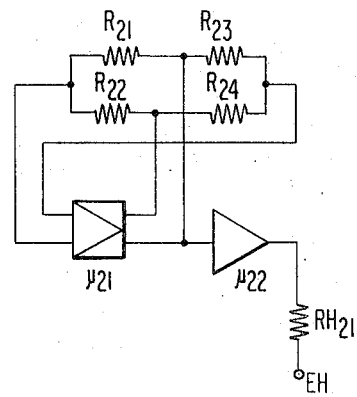
FIG. 2 is a block diagram of another example of known temperature control devices of the proportional type as employs an AC amplifier.

FIG. 2 shows another example of known temperature control devices of the proportional control type. An oscillator is constructed using an amplifier $\mu_{21}$ and a bridge, as a feedback loop, of fixed resistors $R_{21}$ and $R_{24}$ and temperature-sensitive resistors $R_{22}$ and $R_{23}$ having positive temperature coefficients. An oscillation output level proportional to the deviation between an actual temperature and a reference temperature determined by the balance conditions of the bridge is amplified by a power amplifier $\mu_{22}$. The output power is supplied to a heater resistor $R_{H21}$. The heater power is proportional to the deviation between the actual temperature and the reference temperature. The amplifier $\mu_{21}$ is an AC amplifier, which permits a high gain owing to high stability of its amplification factor and which also permits the use of temperature-sensitive resistors of low temperature coefficient of resistance. On the other hand, however, the circuit arrangement is complicated. Where a wound metallic resistance wire is used, the oscillation frequency and the amplification factor are subject to restrictions on account of the frequency characteristic of the impedance of the resistor, and the amplification factor is generaly around 60–70dB. Moreover, the oscillator of the controller exerts adverse effects in the form of noise on the equipment contained in the oven.

Figure 3:
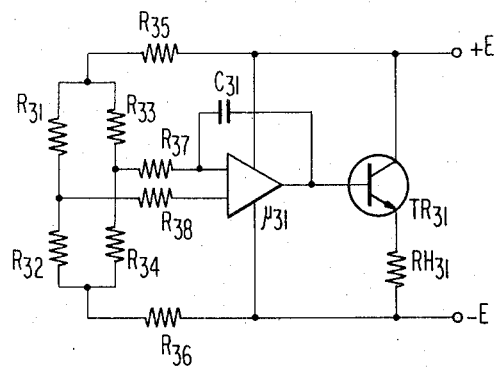
FIG. 3 shows an embodiment of a temperature control device for a thermostatic oven according to the present invention, which employs an integrator.

FIG. 3 shows an embodiment of the temperature control device according to the present invention. Fixed resistors $R_{32}$ and $R_{33}$ and temperature-sensitive resistors $R_{31}$ and $R_{34}$ having positive temperature coefficients are used to constitute a bridge, to which a supply voltage is applied through resistors $R_{35}$ and $R_{36}$. The bridge output is applied through resistors $R_{37}$ and $R_{38}$ to a DC amplifier $\mu_{31}$. An output voltage of the DC amplifier is fed back to the input thereof through a capacitor $C_{31}$. Simultaneously therewith, it is amplified by a power amplifier transistor $TR_{31}$ which supplies a heater resistor $R_{H31}$.

The amplifier $\mu_{31}$, resistor $R_{37}$ and capacitor $C_{31}$ constitute an integrator, whose integral time is $R_{37} \cdot C_{31}$ and whose output is the integral of the bridge output. The supply of the electric power to the heater resistor continues until the deviation from a reference temperature determined by the balance conditions of the bridge is made almost zero. This means that an amplification factor of very high gain is equivalently obtained. The resistors $R_{35}$ and $R_{36}$ are used to determine the bridge supply voltage to prevent self-heating of the temperature-sensitive resistors and also act as bias resistances of the amplifier $\mu_{31}$. It is, therefore, possible to employ metallic resistance wires of comparatively low resistances and low temperature coefficients as the temperature-sensitive resistors and to employ an integrated circuit for linear amplification as the amplifier $\mu_{31}$. The resistor $R_{38}$ is used in order to establish the balance of the input resistances of the amplifier $\mu_{31}$. The integral time $R_{37} \cdot C_{31}$ can be suitably selected according to the thermal time constant between the heater resistor and the temperature-sensitive resistors to maintain the stable operation of the control system. Too small an integral time causes a cyclic variation of the output signal of the amplifier $\mu_{31}$. On the other hand, too large an integral time cannot be realized because $R_{37}$ has an upper-limit value due to the characteristic of the amplifier $\mu_{31}$, and the value of $C_{31}$ cannot be increased without limit. The optimum value of the time constant is selected on a trial-and-error basis.

Figure 4:
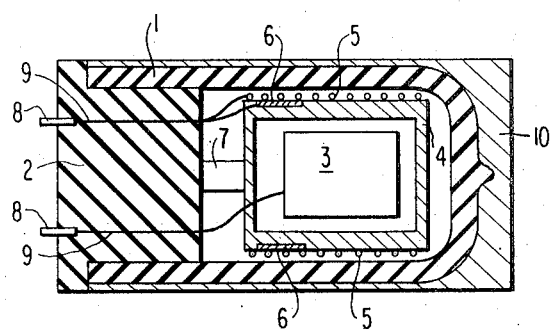
FIG. 4 shows an example of the construction of the thermostatic oven used in combination with the temperature control device according to the invention.

Referring to FIG. 4, showing an example of the construction of the thermostatic oven used in combination with the temperature control device of FIG. 3, the numeral 1 denotes a vacuum bottle; 2, a cap for the vacuum bottle 1; 3, an element to be temperature-controlled, such as a crystal oscillator; 4, a metallic case including the element 3; 5, a heating wire wound on the surface of the metallic case 4; 6, a temperature-sensitive resistor; 7, a supporting bar for supporting the metallic case 4 to the cap 2; 8, output terminals; 9, lead wires for connecting the heating wire 5, the temperature-sensitive resistor 6 and the element 3 to the output terminals 8; and 10, a covering case.

Detailed data of the above example are as follows:
Dimensions of covering case 10: 80 × 80 × 160 mm
Dimensions of vacuum bottle 1:
 inner diameter: 60 mm
 outer diameter: 76 mm
 depth: 140 mm
Dimensions of metallic case 4:
 inner diameter: 40 mm
 outer diameter: 54 mm
 length: 66 mm
 (made of aluminum)

-Continued
Resistance of heating wire 5: 100 ohms
 (made of copper-nickel alloy).
Temperature-sensitive resistor 6: made of platinum wire
Time constant of temperature-
 sensitive resistor: approximately 0.001 sec.
Dead time of the same: approx. 1 sec.
Time constant between metallic
 case and atmosphere: approx. 2.5 hours When this thermostatic oven is used in combination with the temperature control device of FIG. 3, wherein the bridge consists of two platinum resistance wires of 100 ohms at 0°C and two copper-nickel wires of 123 ohms, and the integral time of the integrator is set to 0.005 sec., the average temperature in the oven is 60°C, and the temperature deviation is within the range of ±0.01° against the ambient temperature change of 0 – 50°C, or against the power-supply voltage change of ±10%. The minimized temperature deviation is one-fourth of the value for the case of the same temperature change in the proportional control type, and one-tenth of the value for the case of the same power-supply voltage change in the proportional control type.

Although the embodiment in FIG. 3 has been described as employing the two temperature-sensitive resistors having positive temperature coefficients as the temperature sensors, it is possible, when using a single temperature-sensitive resistor having a positive temperature coefficient, to combine it with a temperature-sensitive resistor having a negative temperature coefficient or with a thermoelectric element, an element whose magnetic permeability varies depending on the temperature, or the like. The heater resistor $R_{H31}$ can be replaced with an endothermic device such as a Peltier effect element.

In accordance with the present invention, there can be realized a thermostatic oven temperature control device which has a small offset and which is less influenced by disturbances of the control device. Furthermore, a temperature control device being small in size, low in cost and high in stability can be provided by employing an integrated circuit for operational amplification as the integrator.

We claim:

1. A temperature control device for a thermostatic oven including a vacuum bottle having a metallic case therein, an element to be temperature-controlled by said device, said element being included in said metallic case, heating means attached to said metallic case for heating said metallic case, temperature-sensing means attached to said metallic case for sensing the temperature of said metallic case, comprising:
 means for converting the deviation of the temperature of said metallic case from a predetermined temperature to a temperature-control signal, said converting means including said temperature-sensing means;
 means coupled to said converting means for integrating said temperature-control signal; and
 means responsive to the output of said integrating means for applying heating power to said heating means, thereby to keep the temperature of said thermostatic oven substantially constant.

2. A temperature control device as recited in claim 1 wherein said means for converting is a resistive bridge and said temperature-sensing means comprises at least one arm of the bridge.

3. A temperature control device as recited in claim 2 wherein said means for integrating comprises operational amplifier means;
a capacitor connected between the input and output of said operational amplifier means; and
a resistor connected between the output of said resistive bridge and the input of said operational amplifier means, whereby the integral time of said means for integrating is determined by the product of the resistance of said resistor and the capacitance of said capacitor.

* * * * *